United States Patent Office 3,426,595
Patented Feb. 11, 1969

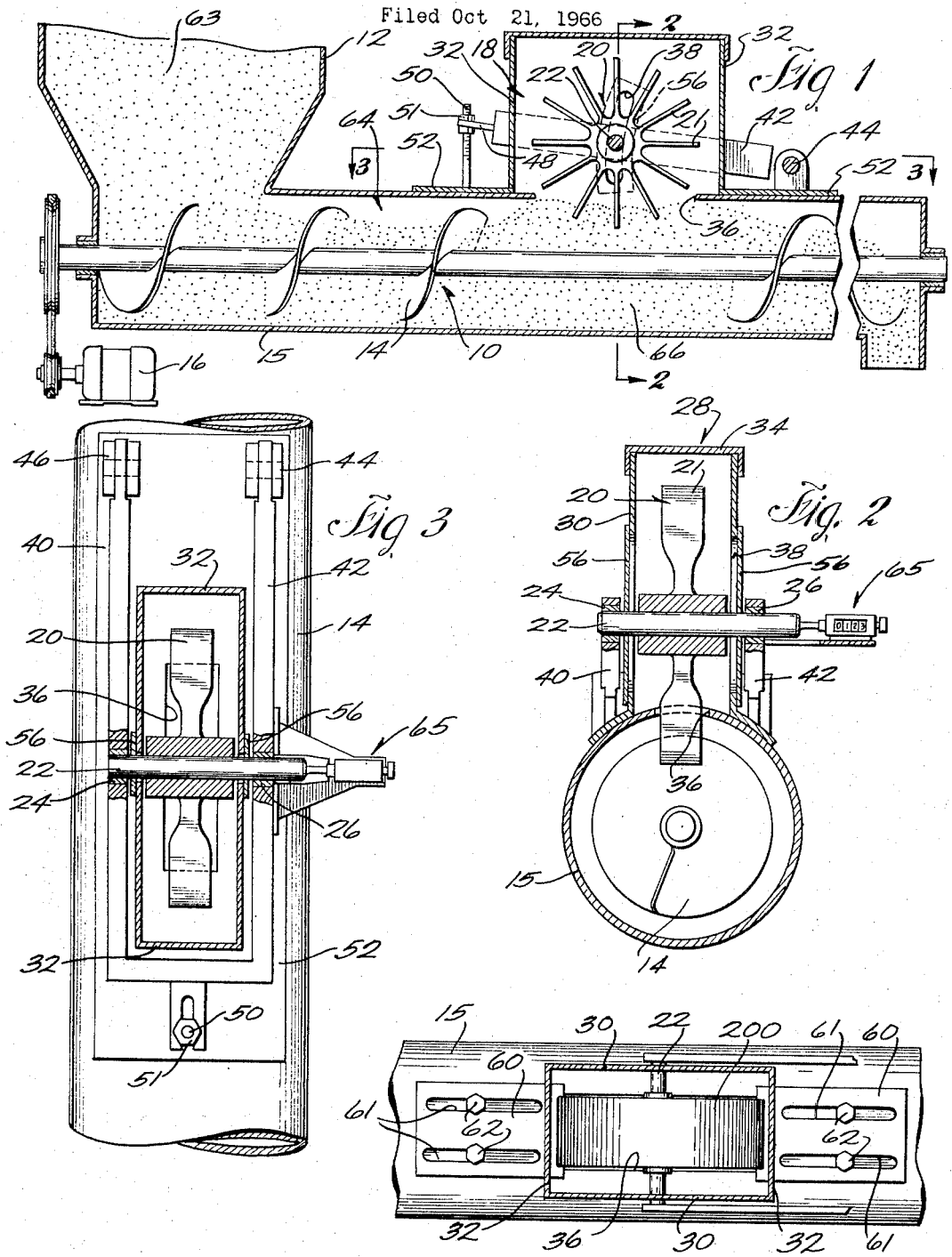

3,426,595
FLOW METER FOR INSTALLATION IN AN AUGER SYSTEM
Robert F. Skelton, Bluffton, Ind., assignor, by mesne assignments, to Mix-Mill, Inc., Bluffton, Ind., a corporation of Delaware
Filed Oct. 21, 1966, Ser. No. 588,480
U.S. Cl. 73—230     10 Claims
Int. Cl. G01f 1/00, 1/08

ABSTRACT OF THE DISCLOSURE

The present invention provides a flow meter having a metering wheel extending into a conveyor duct, said wheel driving a counter and being adjustable for calibration purposes. It is intended for principal use in an auger system wherein a portion of the auger flight is interrupted to permit extension of the measuring wheel into the conveying duct and to insure that the duct will be filled at the point where the measurement is taken, whether or not it is filled throughout its length. The adjustment to calibrate my device comprises radial movement of the wheel to change the effective pitch diameter of the wheel, and thus the rate at which the conveyed material turns it.

---

This invention relates to flow meters for solids conveying systems.

Background of the invention

This invention is an improvement over Massey U.S. Patent 1,897,208 which discloses a measuring device adapted for use with a tubular conveying system employing an auger. In Massey the conveyed material engages and rotates a measuring wheel which has a spherical surface extending into the tube in an area where a portion of the auger flight is removed. The measuring wheel drives a shaft connected to a counter or registering device. A circular collar surrounds the tube opening to prevent coal from jamming in the area between the wheel and the tube opening. This arrangement keeps coal out of the measuring wheel housing, but it is not adjustable radially to calibrate the counter attached to the shaft. Accordingly, it is an object of the present invention to provide a flow meter with a measuring wheel which has an axis movable with respect to the axis of the conduit of the conveying auger to afford adjustment of the readings to correspond to actual flow. In a modified embodiment means are provided to seal the conveying duct to prevent outflow of conveyed material into the measuring wheel housing. Such outflow increases cleaning difficulties and may interfere with performance of the measuring function, although in practice no such interference is observed in my unsealed device. The measuring shaft bearings are preferably located outside the measuring wheel housing to eliminate any difficulties with foreign material in the bearings.

Because of the adjustability of the measuring wheel axis with respect to the axis of the conveying tube, the flow meter of the present invention can be calibrated to indicate the flow rate in pounds per revolution, bushels per revolution, or whatever may be a convenient measuring unit for the conveying system and the conveyed material, without variable elements in the drive train between the metering wheel and the indicator.

Other objects of the invention include a flow meter that is readily installed on an existing auger conveying system.

Further objects and advantages of the present invention will become apparent from the following disclosure in which:

FIGURE 1 is a side elevational view of an auger conveyor employing the flow meter of the present invention, with the housing broken away to show the mechanism.

FIGURE 2 is a cross-sectional view on line 2—2 of FIGURE 1.

FIGURE 3 is a greatly enlarged cross-sectional view on line 3—3 of FIGURE 1.

FIGURE 4 is a view similar to FIGURE 3, showing a modified embodiment of the present invention, the modified measuring wheel being shown in full lines.

Referring now to the drawings, FIGURE 1 shows an auger conveyor generally designated 10, having a hopper 12, an auger 14, a conveying tube 15, a driving motor 16, and a flow meter in accordance with the invention generally designated 18.

The flow meter 18 has a measuring wheel 20 fixed to a shaft 22 journaled in bearings 24 and 26. The measuring wheel 20 has generally radial arms 21 which present surfaces against which conveyed material pushes, and is enclosed by a housing 28. The housing may take any convenient form. As shown, it has two opposed side walls 30, and walls 32 and a cover 34. The measuring wheel 20 is mounted to extend through an opening 36 in conveying duct 15, with its blades 21 disposed in the path of the conveyed material. Shaft 22 extends through a slot 38 in each side wall 30.

In the disclosed construction, the means for moving the measuring wheel 20 toward or away from the axis of conduit 15 to afford adjustment for calibration purposes comprises a pair of arms 40 and 42 respectively pivoted with respect to conduit 15 by a pair of pivots 44 and 46 secured to a plate 52 that desirably is a flange of housing 28 and is secured to the conduit 15. The bearings 24 and 26 and shaft 22 are carried by arms 40 and 42. The ends of arms 40 and 42 opposite the pivots 44 and 46 are connected and are provided with a slotted support tab 48 through which extends a threaded stud 50. The stud 50 carries a pair of nuts 51 positioned on either side of slotted tab 48.

This arrangement is one of many which could be used to permit height adjustment of the measuring wheel and also to secure the measuring wheel in the desired position. The housing itself could carry bearings 24 and 26 and be movable to effect radial adjustment of wheel 28 by pivoting or sliding in a sleeve.

The stud 50 and pivots 44 and 46 are welded or otherwise secured to plate 52 which is part of housing 28. A clamp or other attaching means secures the plate 52 to the conduit. Clamps may be adapted to encircle various size conduits 15.

The slots 38 in housing 28 have arcuate side portions corresponding in radius to the arc described by shaft 22 as arms 40 and 42 are pivoted. This permits movement of shaft 22 and yet provides a minimal opening for escape of conveyed material. Arms 40 and 42 also carry plates 56 which effectively seal the slots 38.

In FIGURE 4 a modified embodiment of the present invention is illustrated with the measuring wheel 200 comprising a featureless cylinder. In this embodiment plates 60 may be provided to seal the opening 36 and prevent movement or loss of the conveyed material into the measuring wheel housing 18, which cannot be done with measuring wheel 20.

The plates 60 are movable longitudinally along the conduit 15 toward or away from the measuring wheel 200 to maintain a seal for opening 36, and accordingly housing 28, as the axis of measuring wheel 200 is moved for calibration purposes.

The plates 60 may be provided with elongated slots 61 and bolts 62 extended through the slots and tapped into the conduit 15 to secure in the plates in the desired position.

In operation of the present invention the rotating auger moves material 63 contained in the hopper along conduit 15. The cross-sectional area of the material in conduit 15 along the auger flight as the material 63 enters conduit 15 may be somewhat less than the diameter of the pipe, as shown at 64. A portion of the auger flighting is removed in the area designated 66 beneath the measuring wheel 20. When the conveyed material 62 reaches area 66 it accumulates until it fills conduit 15 and then moves as a unit with a cross-sectional diameter equal to the cross-sectional area of the interior of conduit 15 past the measuring wheel 20 or 200. The measuring wheel will turn at a rate determined by the speed of the conveyed material in the filled section and by the radius of the exposed portion of the wheel. Since speed of flow will be proportional to the amount conveyed, small quantities of conveyed material can be measured. The radial adjustment permits use of a simple counter 65, with a simple non-adjustable gear train inside or outside housing 28, if needed for a particular unit of measure, to count the units of material conveyed with high accuracy. When the mass filling tube 15 reaches a section of the auger flight it is broken up and the conveyed material returns to the former height as shown at 64. Any conventional registration means 65 can be operated by shaft 22 as shown in FIGURE 3. Shaft 22 can also be utilized to control a device that regulates the rate of flow into the auger, in addition to actuating a counter.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

I claim:

1. A flow meter for a conveying system having an axis and a fixed cross-sectional area filled with conveyed solids, comprising a measuring wheel rotatable about an axis generally transverse to the axis of said conveying system and positioned to be rotated by said conveyed solids, means mounting said wheel for generally radial adjusting movement of said wheel to a plurality of working positions with respect to the axis of said conveying system said movement being sufficient to change the effective radius of engagement between said wheel and said conveyed solids, means adapted to fix said wheel in an adjusted radial working position respecting said conveying system, and registration means responsive to rotation of said measuring wheel.

2. A flow meter for a conveying system having an axis and a fixed cross-sectional area filled with conveyed solids, comprising a measuring wheel rotatable about an axis generally transverse to the axis of said conveying system and positioned to be rotated by said conveyed solids, means mounting said wheel for generally radial adjusting movement with respect to the axis of said conveying system and adapted to change the effective radius of engagement between said wheel and said conveyed solids, means adapted to fix said wheel in an adjusted radial position respecting said conveying system, and registration means responsive to rotation of said measuring wheel, said means mounting said wheel for radial movement comprising a pair of spaced apart arms mounted for pivotal movement with respect to said conveying system, and said means adapted to fix said wheel in radially adjusted position comprising means adapted to fix said arms.

3. A flow meter in accordance with claim 2 wherein said means adapted to fix said arms comprises a stud secured with respect to said conveying system and having a threaded portion, a cross member connecting said arms and having a tab, and means adjustably mounted on said stud and adapted to secure said tab to said stud in radially adjusted positions with respect to the axis of said conveyor.

4. A flow meter in accordance with claim 2 wherein said measuring wheel is enclosed by a housing having two opposed side walls spaced between said arms, said walls having arcuate elongated slots, and said measuring wheel is mounted on a shaft extending through said slots and said arms.

5. A flow meter in accordance with claim 2 wherein said measuring wheel comprises a paddle wheel with generally radially extending arms.

6. A flow meter in accordance with claim 2 wherein said measuring wheel comprises a featureless cylinder.

7. A flow meter in accordance with claim 6 including a pair of plates mounted for adjustment toward and away from the periphery of said cylinder to loosely engage an edge of each said plate with said cylinder to prevent conveyed solids from leaving said conveyor past the periphery of said cylinder.

8. A flow meter in accordance with claim 2 in combination with an auger conveyor.

9. A flow meter in accordance with claim 1 wherein said measuring wheel comprises a paddle wheel with generally radially extending arms.

10. A flow meter in accordance with claim 1 in combination with an auger conveyor.

References Cited

UNITED STATES PATENTS

| | | | |
|---|---|---|---|
| 1,897,208 | 2/1933 | Massy | 73—230 |
| 766,317 | 8/1904 | Bassett | 73—230 |
| 918,097 | 4/1909 | Speed et al. | 73—229 |
| 1,025,227 | 5/1912 | Wylie | 73—227 |
| 1,911,267 | 5/1933 | Danks | 73—229 |
| 2,963,907 | 12/1960 | Sylvest | 73—229 |

FOREIGN PATENTS

| | | |
|---|---|---|
| 589,367 | 2/1925 | France. |

RICHARD C. QUEISSER, Primary Examiner.

E. D. GILHOOLY, Assistant Examiner.

U.S. Cl. X.R.

73—198